Jan. 5, 1971 J. A. KAYSER 3,552,811
BEARING RACE ASSEMBLY
Filed Jan. 8, 1969 2 Sheets-Sheet 1

INVENTOR.
JOHN A. KAYSER
BY Robert A. Jensen
ATTORNEY

United States Patent Office 3,552,811
Patented Jan. 5, 1971

3,552,811
BEARING RACE ASSEMBLY
John A. Kayser, Oregon, Ohio, assignor to Dana Corporation, Toledo, Ohio, a corporation of Virginia
Filed Jan. 8, 1969, Ser. No. 789,767
Int. Cl. F16c *19/34*
U.S. Cl. 308—176                                4 Claims

ABSTRACT OF THE DISCLOSURE

In a universal joint having a pair of yokes and a journal cross with trunions located within apertures in the yokes, a closed end bearing race slidably mounted within the apertures surrounding the trunnion ends. The improvement being a bearing plate secured to the closed end of the bearing race and comprising a resilient body portion which preloads the universal joint while simultaneously preventing rotation of the bearing cap.

BACKGROUND OF THE INVENTION

Universal joints normally comprise a pair of members attached to the ends of shafts adapted to be joined for substantially uniform rotary movement by a journal cross drivingly secured to each member. The members are joined in a manner which allows misalignment of the axis of the members relative to each other. The members normally called yokes, are each provided with a pair of radially opposed axially extending arms or lugs. The journal cross is provided with a central body having projecting therefrom two pairs of opposed radially extending trunnions in an equal circumferentially spaced relationship, designed to be secured within bores in the lugs.

In the construction of a universal joint the trunnions of the joint are aligned and locked in place by a variety of means. Regardless of the locking means used, it is extremely critical that the journal cross be properly centered within the universal joint because the least eccentricity will lead to an unbalancing of the rotating shaft and objectionable vibrations leading to eventual breakdown. In order to minimize the unbalancing, the axial clearance intermediate the end of each trunnion of the journal cross and the corresponding bearing cup bottom must be at a minimum without contact which would generate strains jeopardizing the behavior of the universal joint.

In the standard method of locating the journal cross relative to the yoke of the universal joint the bearing races in the form of cups which surround the trunnions of the journal cross are locked within apertures in the lugs by split rings and corresponding grooves. The machining tolerances for the grooves, the thickness of the split ring, the distance between the ends of the trunnions as well as the thickness of the cup bottom are additive. The result of these tolerances can be either excessive clearance resulting in end play between the trunnion and the yoke or insufficient clearance between the elements resulting in heat and wear generating strains, either of which condition yields improper centering and a resultant unbalanced condition which may lead to material failure.

In addition to the above, the standard assembly, including the ring and groove bottoming device for holding the bearing cup and the journal cross in position, provides no means to absorb sudden loads. These loads are transferred directly to the yoke arms which are necessarily heavy duty non-yielding members. The result of this load upon a non-yielding member is often breakage of parts of lesser strength. Since any dynamic system is occasionally subjected to unusual stresses, it is desirable to have a stress relieving means within the system. The stress relieving means should have a capacity to absorb the expected stress without damage to the elements involved and without a resultant change to the dynamic characteristics of the total assembly.

With the above noted problems in mind, it is an object of the present invention to provide an improved universal joint in general and in particular to provide a bearing cup for use in a universal joint which has a shock absorbing feature to accommodate unusual stresses.

With this object in mind and as a feature of the present invention, there is provided an end plate on the bearing cup which is designed to absorb sudden stresses.

Another object of the present invention is to provide a universal joint wherein the bearing cups are placed in position and abut the trunnion ends with a predetermined preload.

With this object in view and as a feature of the present invention, the bearing cup is provided with an end plate which is adjustable with respect to axial position along the trunnion of the journal cross thus allowing variations in the amount of preload.

The above and other features of the invention including various novel details of construction and combinations of parts will now be more particularly described with reference to the accompanying drawings and pointed out in the claims.

Figure 1:
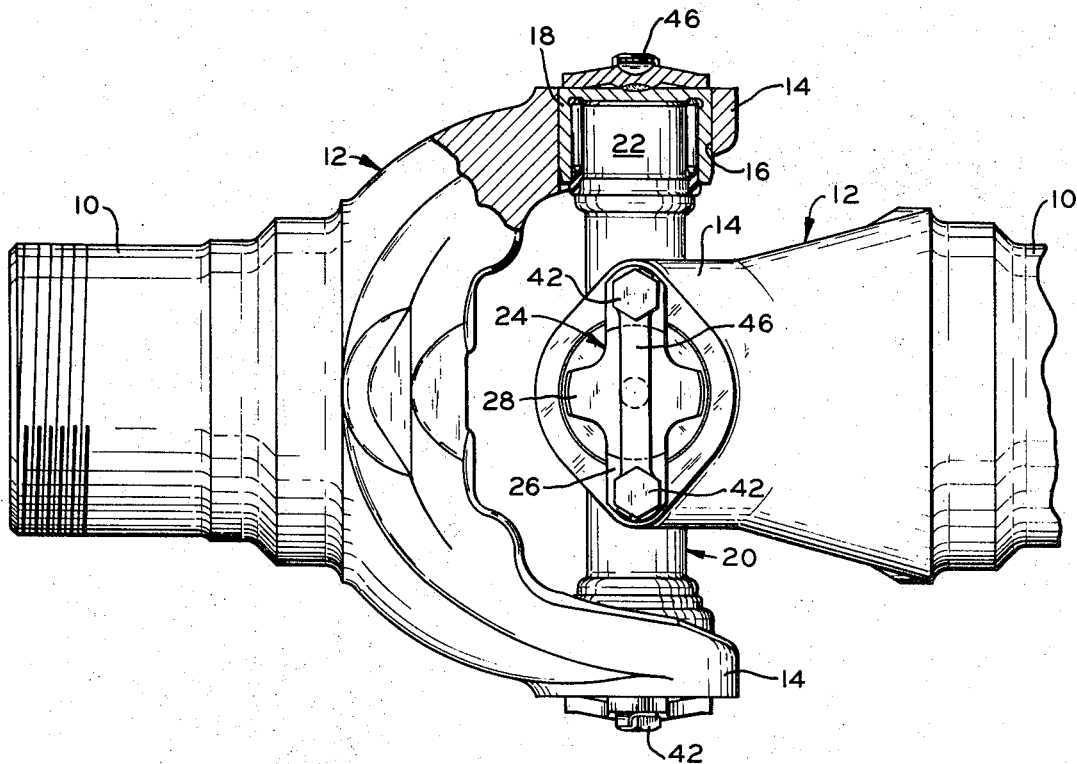
FIG. 1 is an elevation of a universal joint partly in section incorporating the present invention.

As can be seen in FIG. 1, there are a pair of shafts 10 shown as substantially coaxial but not limited thereto, each ending in a bifurcated yoke 12 having a pair of parallel arms 14. Each arm 14 of the yoke 12 has an aperture 16 and has mounted therein a bearing cup 18. The pair of shafts and their attached yokes are positioned, when assembled, so that the axes of the apertures of the yokes are disposed at right angles to each other. Mounted between the respective apertures 16 is a journal cross 20 having trunnions 22 located within the bearing cups 18.

Figure 2:
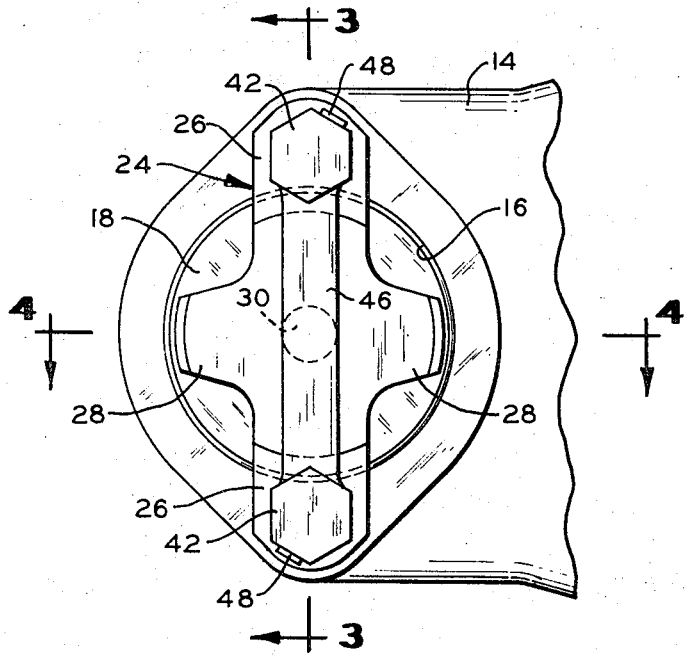
FIG. 2 is an end view of the bearing cup in position within the yoke showing the configuration of the inventive bearing end plate.
Figure 3:
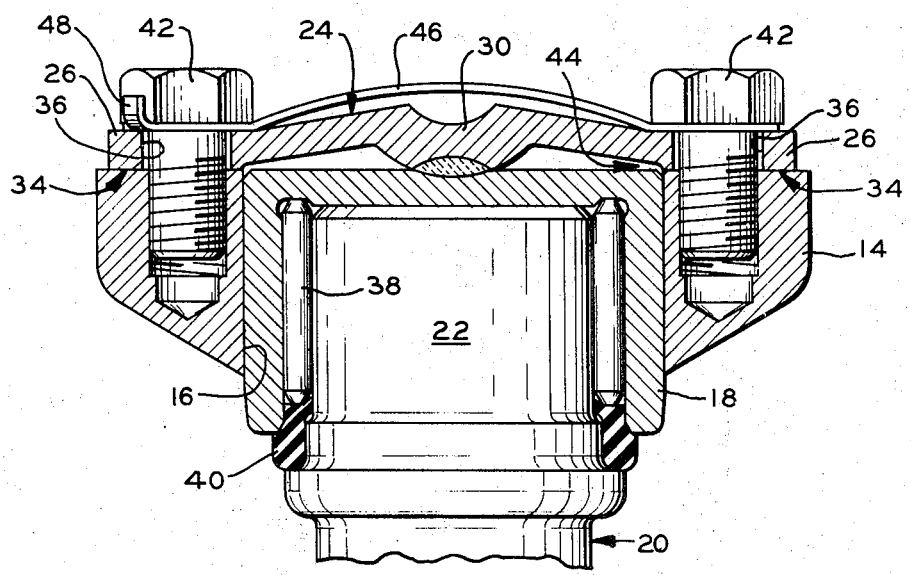
FIG. 3 is a section along lines 3—3 of FIG. 2.
Figure 4:
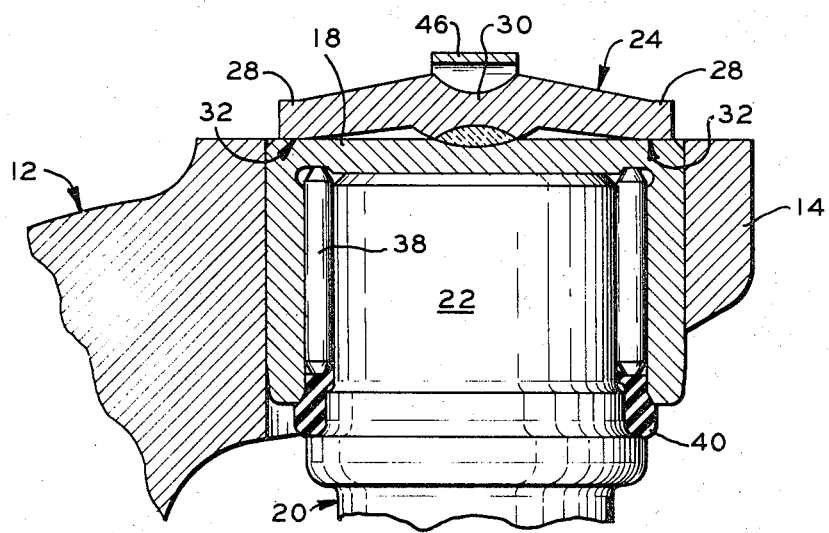
FIG. 4 is a section along lines 4—4 of FIG. 2.

As best seen in FIGS. 2, 3 and 4, the bearing cup end plate, generally designated 24, is a non-planar element having an elongated pair of unilinear arms 26 and a shorter pair of unilinear arms 28 at right angles to and intersecting the arms 26. The bearing cup end plate 24 is generally bowed when viewed in cross section, see FIGS. 3 and 4, with the outer ends of the legs 26, 28 lying in approximately the same plane. The area 30 at the center of the bearing cup end plate, where the arms intersect, has a dimpled formation with the lowest portion lying in approximately the same plane as the ends of the legs 26, 28.

The free ends of the arms 28 of the bearing cup end plate 24 have a flattened lower surface 32. The bearing cup end plates 24 are secured to the bearing cups 18 by means of a weld at the depressed area 30 and stabilized by contact between the outer end of the bearing cup and the flattened portions 32 of the arms 28.

The long arms 26 of the bearing cup end plate 24 extend beyond the outside circumference of the bearing cup 18 and are spaced therefrom with the exception of the central weld. The free ends of the long arms have a flattened portion 34 and bores 36.

Referring now in particular to FIGS. 3 and 4 the relative location of parts and their interaction can be seen. The bearing cup 18 is mounted in an apertures 16 in the yoke arm 14. Mounted against the inside surface of the bearing cup are a plurality of needle bearings 38 held in place by a seal 40. The seal 40 closes the space between the bearing cup 18 and the trunnion 22, holding the bearings 38 in place and retaining the lubricant around the bearings while allowing rotation between the trunnion 22 and the bearing cup 18.

A pair of threaded holes are located in the exterior surface of the yoke arm 14 and bolts 42 pass through the bores 36 in arms 26 into the threaded holes in the yoke arm.

It is to be noted that the only contact that the bearing cup end plate 24 has with the yoke arm 14 is the flattened end portion 34. This portion is secured in position by means of bolts 42. The only contact between the bearing cup end plate 24 and the bearing cup 18 is at the depressed center portion 30 of the end plate and the flattened ends 32 of the short arm. It will be remembered that the bearing cup end plate 24 is of a bowed configuration which results in a gap 44 between the end of the bearing cup 18 and the end plate 24, see FIG. 2.

The gap 44 allows limited movement of the bearing cup within the yoke arm.

The bearing cup end plate 24 can vary in thickness and composition but it has been found that half hard steel has the most desirable characteristics. During assembly, the plate can be bent to accommodate tolerances of the other parts of the assembly and still provide the proper clearance between the plate and the cup.

The use of the bowed bearing cup end plate with a space between the cup end and the plate allows unusual loads to be absorbed by the plate instead of being transferred to the yoke arms which must necessarily be rigid to withstand torque stresses. The resultant flexibility further allows the drive train which includes the subject joint to be used at much higher r.p.m. than heretofore possible.

Mounted on top of the bearing cup end plate is a band 46 having upturned tabs 48 which abuts a flat of the bolts 42 assuring that they remain at the proper tightness without danger of loosening by vibration.

It will be understood that the particular assembly embodying the invention is shown by way of illustration only and not as a limitation of the invention. The principles and features of this invention may be employed in varied and numerous embodiments without departing from the scope of the invention.

Having thus described my invention, what I claim as new and desire to secure by Letters Patent of the United States is:

1. A bearing race assembly, for use in a bore having a surrounding wall, comprising a cup shaped bearing race having opposed closed and open ends and insertable into a bore open end first and a bearing plate fixedly secured to the closed end of the bearing race for securing said assembly to the wall, said bearing plate comprising an elongated resilient portion extending radially outwardly on opposite sides of said race beyond the periphery thereof and a pair of ears extending generally at right angles to said elongated portion and abutting the closed end of said bearing race, said elongated portion being generally spaced from the closed end of said bearing race and overlying same whereby said race is properly positioned and preloaded endwise when the outwardly extending portions are secured to the wall and so will allow endwise movement of said race to absorb thrust loads without overstressing the closed end of said bearing race.

2. A bearing race as in claim 1 wherein said elongated portion at a location intermediate its ends is welded to said bearing race and has the majority of its length spaced from and overlying the closed end of said bearing race.

3. A bearing race as in claim 2 wherein the bearing plate is made of half-hard cold rolled steel.

4. A bearing race as in claim 1 wherein the outwardly extending portions of said bearing plate include apertures for removably securing said bearing race to the surrounding wall.

References Cited

UNITED STATES PATENTS

| 2,794,693 | 6/1957 | Burkhalter | 308—212 |
| 2,976,091 | 3/1961 | Miller | 308—212 |
| 3,050,351 | 8/1962 | Kempf | 308—174 |
| 3,061,822 | 10/1962 | Mitchell | 308—176X |
| 3,439,965 | 4/1969 | Kleinschmidt | 308—212 |

FOREIGN PATENTS

| 874,170 | 8/1961 | Great Britain | 308—212 |

JAMES A. WONG, Primary Examiner

U.S. Cl. X.R.

64—17; 308—212